United States Patent [19]

Wilson

[11] Patent Number: 5,741,029
[45] Date of Patent: Apr. 21, 1998

[54] PIPING ADAPTER

[75] Inventor: Lawrence G. Wilson, Howell, Mich.

[73] Assignee: Tru-Flex Metal Hose Corporation, Ashburn, Va.

[21] Appl. No.: 601,103

[22] Filed: Feb. 14, 1996

[51] Int. Cl.$^6$ .................................................. F16L 13/04
[52] U.S. Cl. .......................... 285/114; 285/117; 285/417; 285/424
[58] Field of Search ..................... 285/114, 237, 285/424, 253, 177, 417

[56] References Cited

U.S. PATENT DOCUMENTS

| | | |
|---|---|---|
| 1,280,312 | 10/1918 | Schere ................................. 285/177 |
| 1,455,027 | 5/1923 | Ludwig ................................. 285/177 |
| 1,818,858 | 8/1931 | McAlees ................................. 285/177 |
| 2,013,193 | 11/1935 | Stadtfeld . |
| 2,257,895 | 3/1941 | Woodford et al. . |
| 2,420,153 | 12/1947 | Sprenger et al. . |
| 2,516,631 | 2/1950 | Jacobson . |
| 2,628,111 | 8/1953 | Smalline . |
| 2,666,657 | 2/1954 | Howard et al. . |
| 2,857,176 | 2/1958 | McTaggart . |
| 3,086,556 | 4/1963 | Kanter . |
| 3,135,295 | 6/1964 | Ziebold . |
| 3,169,785 | 2/1965 | Ziebold . |
| 3,299,417 | 1/1967 | Sibthorpe . |
| 3,393,267 | 7/1968 | Busse . |
| 3,407,449 | 10/1968 | Tetzlaff et al. ....................... 285/253 X |
| 3,549,176 | 12/1970 | Contreras . |
| 3,841,207 | 10/1974 | Piot . |
| 4,093,282 | 6/1978 | Kyriakodis ......................... 285/253 X |
| 4,109,941 | 8/1978 | Wood et al. ........................ 285/114 X |
| 4,214,380 | 7/1980 | Meyer . |
| 4,306,491 | 12/1981 | Reardon, Jr. . |
| 4,385,623 | 5/1983 | Jacklich . |
| 4,418,943 | 12/1983 | Ionna ................................. 285/177 X |
| 4,608,963 | 9/1986 | Townsend . |
| 4,846,147 | 7/1989 | Townsend et al. . |
| 4,846,512 | 7/1989 | Karakawa ............................. 285/424 |
| 4,854,416 | 8/1989 | Lalikos et al. . |
| 4,867,269 | 9/1989 | Lalikos et al. . |
| 5,026,096 | 6/1991 | Lutz ................................... 285/114 |
| 5,042,172 | 8/1991 | Foco et al. . |
| 5,080,405 | 1/1992 | Sasa et al. . |
| 5,362,113 | 11/1994 | Thomas . |
| 5,390,967 | 2/1995 | Gooderham et al. .................. 285/177 |
| 5,391,064 | 2/1995 | Lopez ................................. 285/237 X |

*Primary Examiner*—Dave W. Arola
*Attorney, Agent, or Firm*—Litman, McMahon and Brown, L.L.C.

[57] ABSTRACT

An adapter is provided for fluidically interconnecting first and second piping runs and includes a body with first and second end sections each forming a respective receiver for receiving a piping run end. A body transition section is provided for interconnecting the first and second sections. A retainer assembly includes a retainer strap which can mount annular clamps on one or both of its ends for attaching the piping runs to the adapter. The body sections include notches or crimps which facilitate effective connections between the piping ends and the body sections.

18 Claims, 4 Drawing Sheets

PIPING ADAPTER

BACKGROUND OF THE INVENTION

1. Field of the Invention

The present invention relates generally to fluid conduit systems and in particular to an adapter for securely interconnecting first and second piping runs, which can be dissimilar in size and construction.

2. Description of the Related Art

Fittings, connectors and the like are common in fluid conduit systems and various types have been devised for meeting the requirements of particular applications. For example, straight connectors, tees, elbows, unions and other connectors are commonly utilized for interconnecting two or more piping runs. A common problem arises when the piping runs being connected have dissimilar constructions, sizes, materials and other characteristics.

An example of a common condition requiring connection of dissimilar piping runs can be found in exhaust systems for combustion-type applications such as furnaces, hot water heaters, gas clothes dryers, etc. Such appliances are commonly connected to the exhaust ventilation system of a structure in which they are installed by flexible metal hose or piping. The flexibility of such connecting hose facilitates connecting the appliance exhaust with the vent system of the structure. An example of a suitable flexible metal hose is shown in the Thomas U.S. Pat. No. 5,228,479 and U.S. Pat. No. 5,494,319, which are assigned to a common assignee herewith. Such flexible metal hose is available in various sizes, configurations and material combinations for meeting the requirements of particular appliance exhaust applications. Exhaust piping which is directly connected to an appliance is commonly a single-wall type of construction, which can include multiple, overlying, spiral-wound layers of material forming a single-thickness wall.

The vent piping run from the structure is commonly a double-wall construction type with an inner liner and an outer sleeve. Such vent piping is often designated "Class B" for building code purposes since the double-wall construction thereof permits placement in proximity to combustible materials with the internal air gap or installation layer between the liner and the sleeve reducing the risk of combustion from the hot exhaust gases.

A common situation in construction and in the installation of such gas appliances involves the need to connect such different types of hoses and pipes to form an effective exhaust gas system. The present invention addresses this problem.

SUMMARY OF THE INVENTION

In the practice of the present invention, an adapter is provided for fluidically interconnecting first and second piping runs which can be included in, for example, an exhaust system for a combustion-type appliance. The adapter includes a body with first and second sections each forming a receiver for receiving a respective piping run end. A transition section interconnects the first and second end sections and can have, for example, a frusto-conical, converging configuration. A retainer assembly includes a retainer strap mounted on the adapter body and connected to an annular clamp at one or both of its ends. The piping runs are secured at their ends to the adapter body section by annular clamps which clampingly engage one of the body section and the piping run at each adapter end.

OBJECTS AND ADVANTAGES OF THE INVENTION

The principle objects and advantages of the present invention include: providing an adapter for first and second piping runs; providing such an adapter which fluidically interconnects dissimilar first and second piping runs; providing such an adapter which includes attached annular clamps; providing such an adapter with section ends adapted for diameter-adjustment; providing such an adapter which provides a transition between body sections with different diameters; providing such an adapter which can be installed with relatively simple tools; providing such an adapter which can quickly installed; providing such an adapter which can be formed of sheet metal in various configurations; providing such an adapter which is suitable for connecting flexible metal hose to B-type exhaust vents; providing such an adapter which can be fabricated from various materials; providing such an adapter which can be fabricated from materials for resisting corrosion; providing such an adapter which is particularly well suited for connecting piping runs in a vent system for a gas combustion appliance within a structure; and providing such an adapter which is efficient in operation, relatively simple to manufacture, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
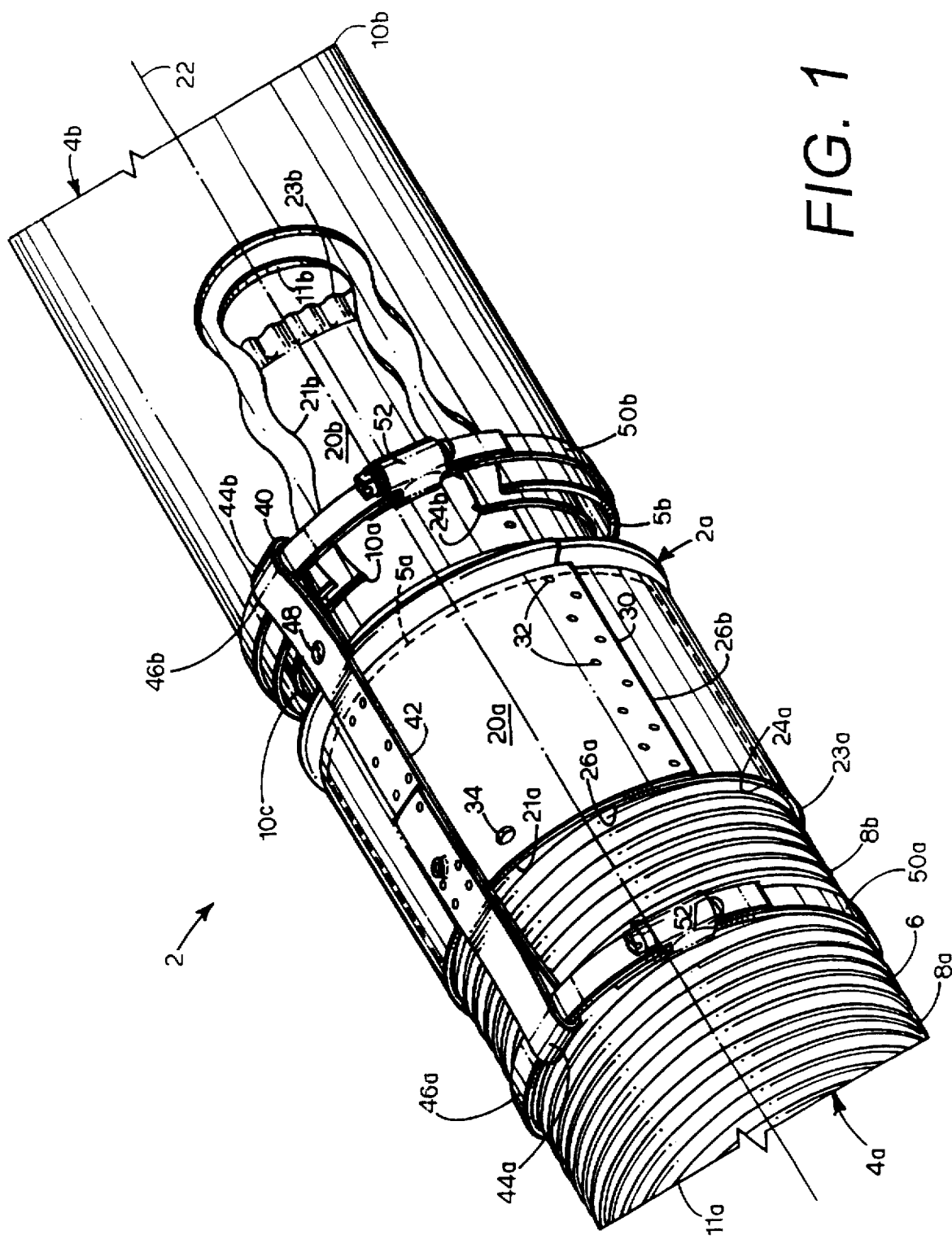
FIG. 1 is a perspective view of an adapter for fluidically interconnecting first and second piping runs.
Figure 2:
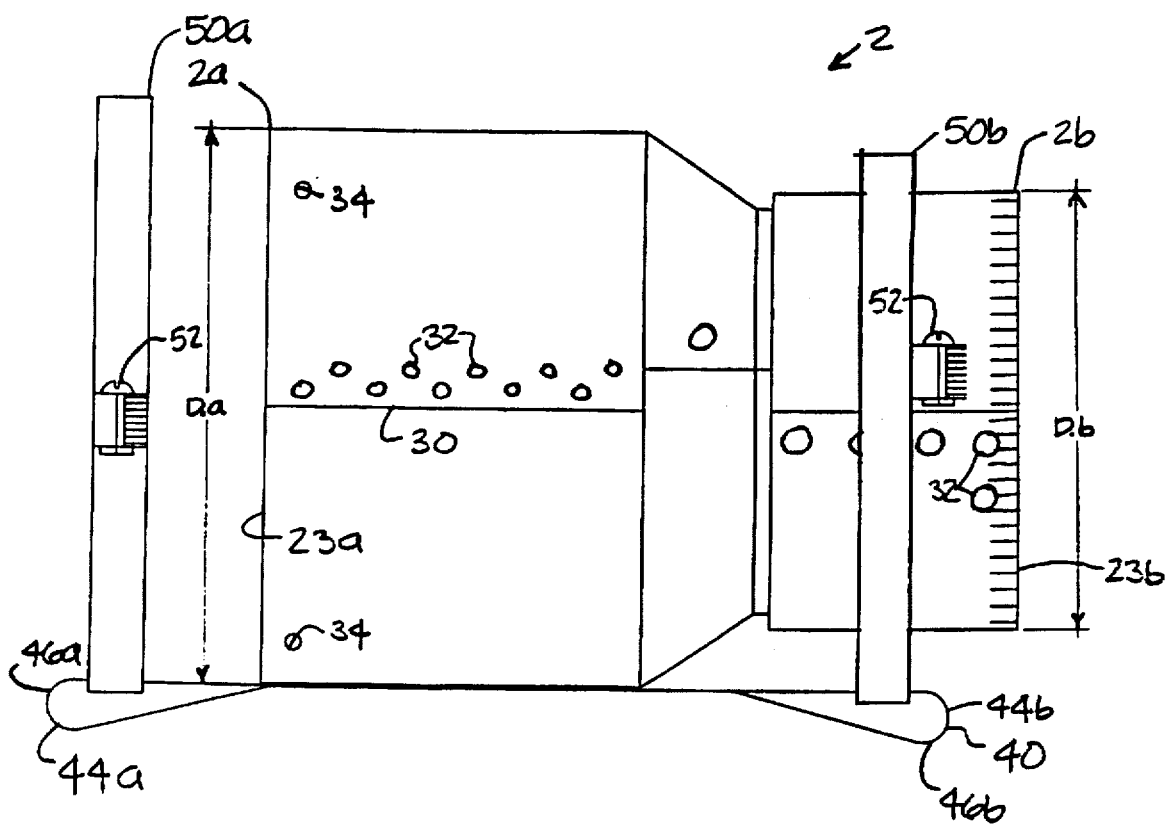
FIG. 2 is a side elevational view of the adapter.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, reference numeral 2 generally designates an adapter embodying the present invention and fluidically interconnecting first and second piping runs 4a, 4b with respective ends 5a, 5b. The first piping run 4a is a single-wall construction with spiral or helical corrugations 6 and a construction utilizing inner and outer material plies 8a, 8b. The corrugations 6 provide the first piping run 4a with considerable flexibility.

The second piping run 4b comprises double-wall type construction with an inner, smooth-walled liner 10a and an outer, smooth-walled sleeve 10b. The second piping run 4b is of a type commonly designated "B-vent" for building code reference purposes. Such B-vent piping is thus commonly specified for exhaust flues and similar applications because it includes an air space 10c between the liner and sleeve 10a, 10b whereby the air space 10c insulates the piping run 4b to reduce fire hazards when the second piping run 4b is used, for example, in exhaust gas applications, such as from combustion appliances. Such appliances can include furnaces, gas-fired hot water heaters, etc.

The piping runs 4a, 4b may comprise, for example, part of an exhaust system from a combustion-type appliance with the flexible first piping run allowing a curved path from the appliance or exhaust gas source. The second, downstream piping run 4b can extend through walls and floors of a structure to an appropriate external outlet. The first piping run 4a includes a bore 11a and the second piping run liner includes a bore 11b.

Although particular types of piping runs 4a, 4b are shown, the adapter 2 of the present invention is useable with a wide variety of other types of piping configurations, including flexible metal hose, smooth wall pipes, corrugated pipe and various multiple-layer constructions. For example, piping systems for various fluids and bulk materials could be utilized with the adapter of the present invention. Moreover, various sizes of piping runs, including piping runs with different inside and outside diameters, can be joined with the adapter 2.

The adapter 2 generally comprises a body 2a and a piping connector system 2b.

II. Adapter Body 2a

The adapter body 2a generally includes first, second and transition sections 20a,b,c which are substantially coaxial about a longitudinal axis 22 and form respective first and second receivers 21a,b. The first and second sections 20a,b include first and second open ends forming first and second mouths 24a,b. The transition section 20c has a tapered, converging, frusto-conical configuration which converges from the larger-diameter D.a of the first section 20a to the lesser diameter D.b of the second section 20b.

The second section 20b includes annular constriction or compression means comprising a plurality of radial-spaced crimps 26 extending from the second section end 23a. The crimps 26 permit the second section end 23b to constrict or compress annularly a slight amount to effect a relatively tight, frictional engagement with the second piping run liner 10a. Multiple fastener holes 34 can be provided in the body first section 20a in proximity to its end 23a for receiving fasteners which, if necessary, can provide additional mounting support for the first piping run 4a.

The body 2a can be formed by any suitable method, for example by roll forming from a flat piece of sheet metal stock to provide inner and outer edges 26a,b forming an overlapping seam 30 which can be secured together by rivets 32, spot welds or any other suitable means. The overlapping seam 30 shown is particularly well suited for joining light gauge sheet metal stock. Other joining techniques, such as butt welding the edges, could be utilized with, for example, heavier stock.

III. Fastening System 2b

The fastening system 2b includes a retainer strap 40 with a relatively straight base 42 terminating at first and second ends 44a,b forming first and second retainer loops 46a,b formed by folding over the base 42 on itself and securing it with appropriate mechanical fasteners, such as rivets 48, spot welds, etc.

First and second annular clamps 50a, 50b can comprise, for example, the type of clamps commonly used for tightening hoses in place with screw adjustment subassemblies 52 which either constrict or expand the diameters of the clamps 50a,b. Such annular clamps 50a,b are readily commercially available, as well as other types of hose clamps and the like which would be suitable for annularly gripping the adapter 2 and/or the piping runs 4a,b. The clamps 50a,b are respectively received in the retainer strap loops 46a,b.

IV. Operation

In operation, the adapter 2 functions to fluidically connect the first and second piping runs 4a,b. The first end mouth 24a telescopically receives the first piping run end 5a. The first piping run 4a is encircled and clamped by the first annular clamp 50a in spaced relation from the first section end 23a. The first piping run end 5a is thus retained in place in the first section receiver 21a. The retainer strap 40 prevents the first piping run end 5a from withdrawing from the adapter first receiver 21a.

The adapter second section 20b is received at its end 5b in the sleeve bore 11b. The first annular clamp 50a can be frictionally tightened onto the first piping run 4a for securing same within the adapter first section 20a and the second clamp 50b can be tightened on the second piping run sleeve 10b for retaining the second adapter section end 5b within the second piping section liner 10a. The screw adjustment assemblies 52 can be utilized for tightening or loosening the frictional grips of the clamps 50a,b on the respective piping runs 4a,b for attaching or releasing same.

Fluid, such as exhaust gas, thus flows from the first piping run 4a into the adapter first section 20a, through the transition section 20c, through the second adapter section 20b and into the second piping run 4b. Substantially fluid-tight seals are formed between the respective components for minimizing leakage.

V. First Modified Embodiment Adapter 102

Figure 3:
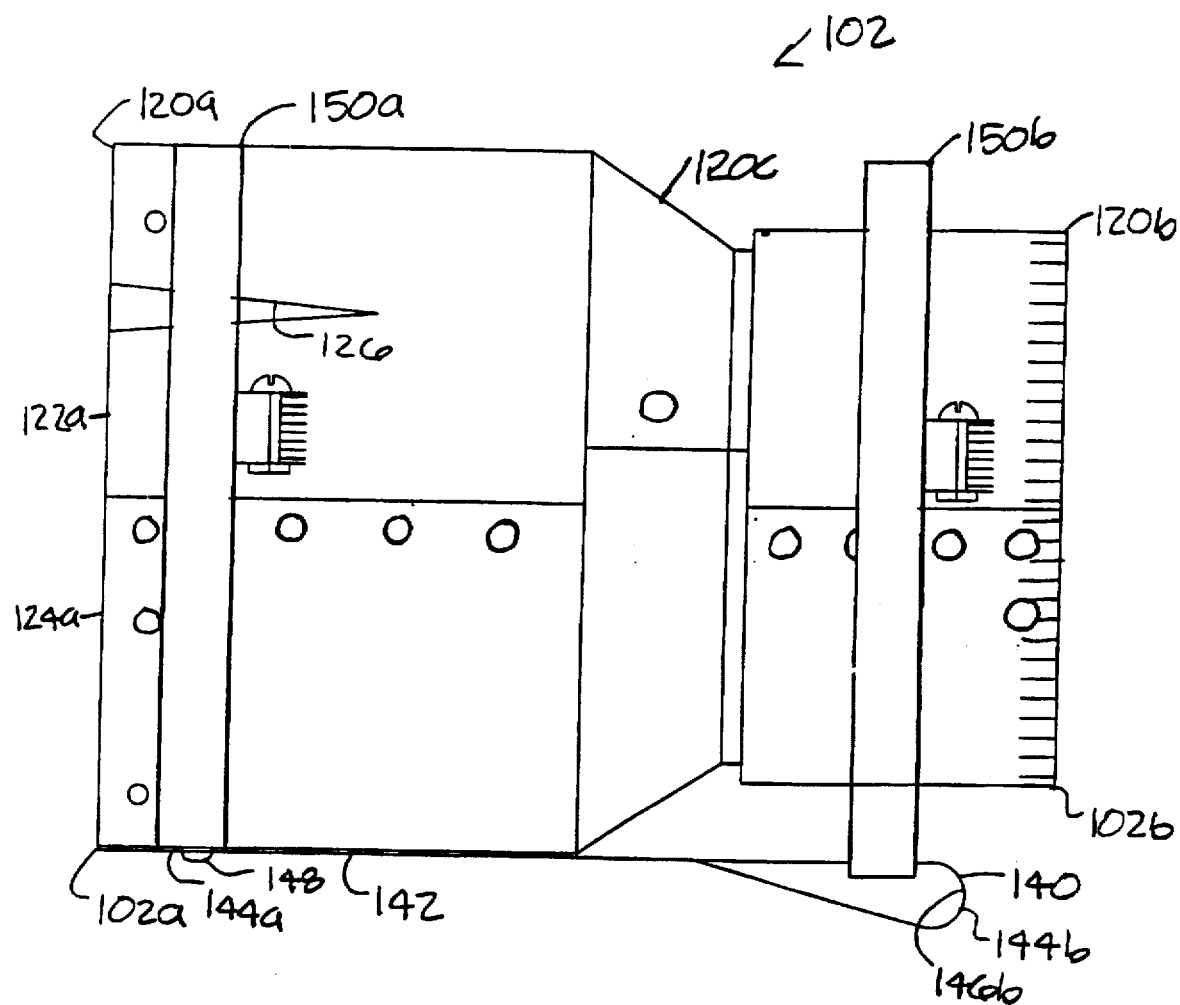
FIG. 3 is a side elevational view of an adapter for fluidically interconnecting first and second piping runs comprising a first modified or alternative embodiment of the present invention.

FIG. 3 shows an adapter 102 comprising a first modified or alternative embodiment of the present invention with a body 102a and a retainer assembly 102b. The body 102a includes first and second sections 120a,b interconnected by a transition section 120c. The adapter body first section 120a includes an open end 122a forming a mouth 124a. The end 122a includes constriction means for adjusting a diameter thereof, which comprises a notch 126 open at the first section end 122a and extending in a downstream direction therefrom.

The retainer assembly 102b includes a retainer strap 140 with a substantially straight base 142 having a first, straight end 144a and a second end 144b forming a loop 146b formed by folding over double on the retainer strap base 142 and securing in place by means of a suitable mechanical fastener, such as a rivet 148.

The retainer assembly 102b includes first and second annular clamping means 150a,b, which can be similar to the clamps 50a, 50b described above. The retainer strap second end 144b secures the first clamp 150a in place on the first body section 120a, for example, by means of a rivet 148. The clamp 150a is positioned in spaced relation slightly downstream from the first section end 122b and is approximately centered over the notch, which is thereby closed or open to constrict or expand the first section mouth 124a as necessary.

The adapter first section 120a receives a first piping run (not shown) therein and is tightened thereon by the first clamp 150a which facilitates adjusting the diameter of the adapter first section 120a by means of the notch 126.

The second adapter body section 120b is received in a second piping run, such as the second piping run liner 10a, in the same manner as described above in connection with the adapter 2.

VI. Second Modified Embodiment Adapter 202

Figure 4:
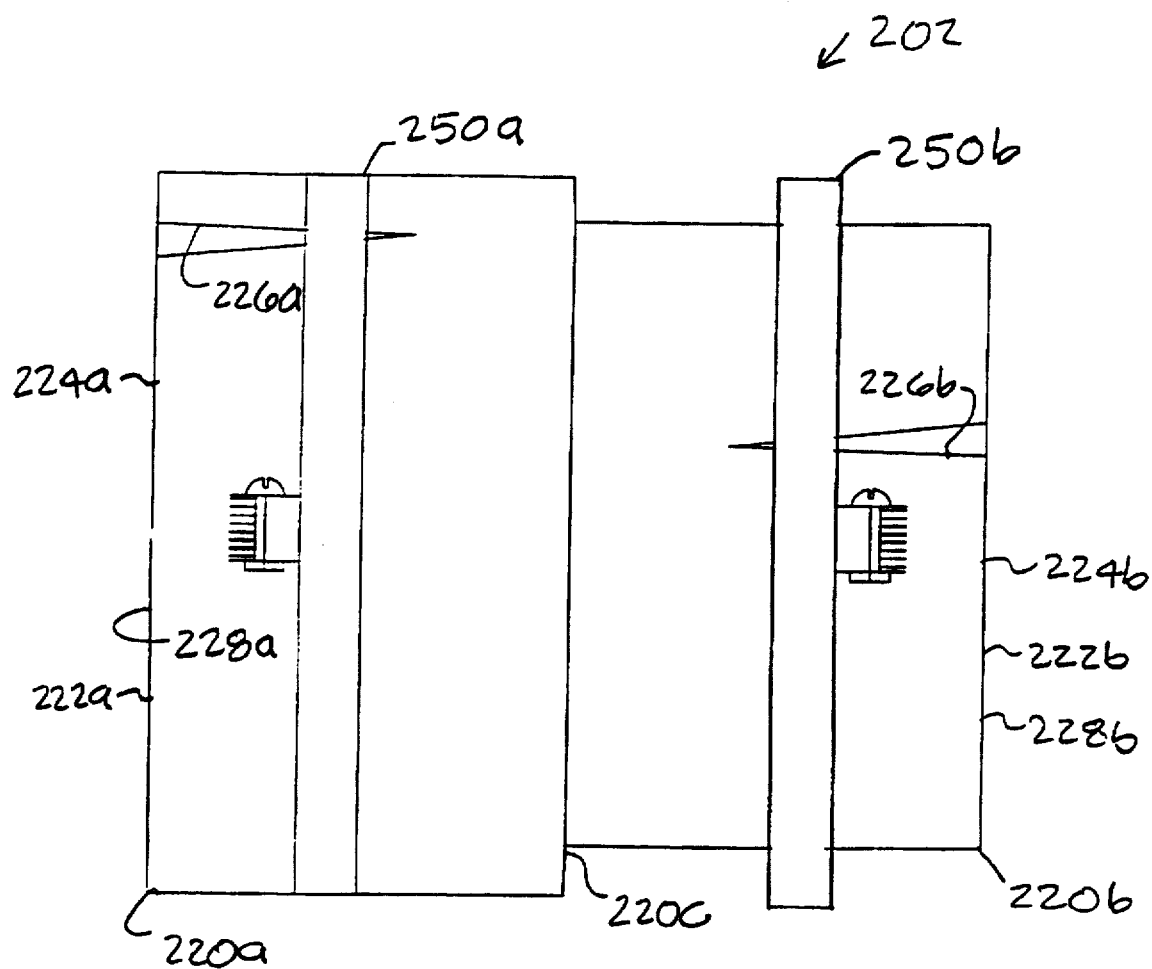
FIG. 4 is a side elevational view of an adapter for fluidically interconnecting first and second piping runs comprising a second modified or alternative embodiment of the present invention.

FIG. 4 shows an adapter comprising a second modified embodiment of the invention generally designated by the reference numeral 202 and including a body section 202a and a retainer subassembly 202b. The adapter 202 includes first and second sections 220a, 220b fluidically interconnected by a transition section 220c. The body first and second sections 220a,b have first and second ends 222a,b forming first and second mouths 224a,b. Each body section 220a,b includes a respective notch 226a,b.

Each adapter body section 220a,b includes a receiver 228a,b respectively receiving one of the first and second piping runs. The retainer subassembly 202b includes first and second clamps 250a,b which can be similar to the annular clamps 50a,b described above. With the piping ms in place within the receivers 228a,b, respective annular clamp means 250a,b can be tightened to secure the adapter 202 to the piping runs.

VII. Materials and Construction

The adapters 2, 102 and 202 embodying the present invention can be manufactured from any suitable materials using any suitable manufacturing techniques. For example, they could be roll-formed from sheet metal with overlapping seams or butt-welded seams. They could also be roll-formed from solid lengths of tubing, and they could be drawn or cast.

The material is preferably selected for the particular application for which the adapter is intended. For example, corrosion resistance is important in many applications, such as in exhaust gas systems. Aluminum, galvanized steel and galvanized aluminum (under the trademark "GALVALUME") are suitable material choices for many applications.

It is to be understood that while certain forms of the present invention have been illustrated and described herein, it is not to be limited to the specific forms or arrangement of parts described and shown.

What is claimed and desired to be secured by Letters Patent is as follows:

1. An adapter for fluidically interconnecting first and second piping runs having first and second piping run ends respectively, which includes:
 (a) a first section including means for fluidic interconnection to the first piping run end and including a first section end;
 (b) a second section including means for fluidic interconnection to said second piping run end and including a second section end;
 (c) a transition section interposed between said first and second sections and fluidically interconnecting same;
 (d) first annular clamp means associated with said first and second sections and clampingly engaging one of the first section and the first piping run;
 (e) second annular clamp means associated with said second section and clampingly engaging one of the second section and the second piping run; and
 (f) a retainer with a base means for connection to one of the adapter sections and an end connected to one of the clamp means, said end forming a loop receiving said one of the clamp means.

2. The adapter according to claim 1, which includes:
 (a) said first piping run comprising a single-wall type; and
 (b) said second piping run comprising a double-wall type.

3. The adapter according to claim 1, which includes:
 (a) said first section having a first diameter;
 (b) said second section having a second diameter less than the first section diameter;
 (c) said first piping run end being telescopically received within said first section; and
 (d) said second piping run end being telescopically received in said second section.

4. The adapter according to claim 1, which includes:
 (a) said sections having first and second open ends forming first and second adapter mouths;
 (b) said retainer end extending beyond said first section end; and
 (c) said first annular clamp means clamping said first piping run in spaced relation beyond said first section end.

5. The adapter according to claim 4, which includes:
 (a) said second piping run comprising double-wall type piping with an inner liner and an outer sleeve; and
 (b) said second clamp means clampingly engaging said second piping run outer sleeve.

6. The adapter according to claim 1, which includes:
 (a) said first section end being crimped.

7. The adapter according to claim 1, which includes:
 (a) said first section end having a longitudinally-extending notch open thereat.

8. The adapter according to claim 1, which includes:
 (a) said second section end having a longitudinally-extending notch.

9. The adapter according to claim 1, which includes:
 (a) said retainer having a second end; and
 (b) said retainer first and second ends forming first and second loops respectively receiving said first and second annular clamp means.

10. The adapter according to claim 1, which includes:
 (a) said first, second and transition sections are roll-formed from a single piece of sheet metal stock;
 (b) a longitudinal seam formed by overlapping first and second edges of said first, second and transition sections; and
 (c) seam fastening means for fastening said edges together in overlying relation.

11. The adapter according to claim 10 wherein said seam fastening means comprises rivets.

12. The adapter according to claim 10 wherein said seam fastening means comprises spot welds.

13. The adapter according to claim 10 wherein:
 (a) said sections comprise Galvalume steel.

14. The adapter according to claim 1 wherein:
 (a) said sections comprise aluminum.

15. The adapter according to claim 1 wherein each said annular clamp means comprises:
 (a) an annular band; and
 (b) screw means for tightening said band.

16. The adapter according to claim 1, which includes:
 (a) each said clamp means having constrictor means for adjusting the diameter thereof.

17. An adapter for fluidically interconnecting first and second piping runs having first and second piping run ends respectively, which includes:

(a) a first section having:
   (1) a first section receiver with a first receiver diameter, said receiver receiving said first piping run end; and
   (2) a first section open end forming a first section mouth;
(b) a second section having:
   (1) a second section receiver with a second receiver diameter less than said first section receiver diameter, said second receiver receiving said second piping run end;
   (2) a second section open end forming a second mouth; and
   (3) said second section end being crimped around said mouth;
(c) a transition section fluidically interconnecting said first and second section receivers;
(d) a pair of longitudinally-extending, overlapping edges forming an overlapping seam extending longitudinally between said section ends;
(e) mechanical fasteners securing said sections together along said overlapping seams;
(f) said first, second and transition sections forming an adapter body;
(g) said transition section having a tapered, frusto-conical configuration converging from said first section to said second section; and
(h) a retaining assembly including:
   (1) a retainer strap having a base mounted on said body first section;
   (2) said strap having first and second ends forming first and second loops;
   (3) first and second annular hose clamps each received in a respective retainer strap loop and engaging a respective piping run for retaining same on a respective adapter body section.

18. An adapter for fluidically interconnecting first and second piping runs having first and second piping run ends respectively, which includes:

(a) a first section including means for fluidic interconnection to the first piping run end and including a first section open end;
(b) a second section including means for fluidic interconnection to said second piping run end and including a second section open end;
(c) a transition section interposed between said first and second sections and fluidically interconnecting same;
(d) first annular clamp means associated with said first section and clampingly engaging one of the first section and the first piping run;
(e) second annular clamp means associated with said second section and clampingly engaging one of the second section and the second piping run;
(f) said first section having a first section receiver with a first receiver diameter, said first section receiver receiving said first piping run end;
(g) said second section having a second section receiver with a second receiver diameter less than said first receiver diameter;
(h) said first section open end forming a first section mouth and said first section including a first notch open at said first section mouth and extending longitudinally therefrom;
(i) said second section open end forming a second section mouth and said second section including a second notch open at and extending longitudinally from said second section end;
(j) said first section receiver receiving said first piping run end;
(k) said second section being received in said second piping run end; and
(l) said second annular clamp means forming an annular gap around said second section, said gap being adapted to receive said second piping run end.

* * * * *